(12) United States Patent
Montanaro et al.

(10) Patent No.: US 6,826,185 B1
(45) Date of Patent: Nov. 30, 2004

(54) ENCODED AUDIO-VIDEO STREAMS REMULTIPLEXING EQUIPMENT

(75) Inventors: Achille Montanaro, Turin (IT); Luigi Mori, Canegrate (IT); Luciano Pilati, Turin (IT); Maura Turolla, Almese (IT)

(73) Assignee: Telecom Italia Lab S.p.A., Turin (IT)

(*) Notice: Subject to any disclaimer, the term of this patent is extended or adjusted under 35 U.S.C. 154(b) by 0 days.

(21) Appl. No.: 09/570,152

(22) Filed: May 12, 2000

(30) Foreign Application Priority Data

May 14, 1999 (IT) .......................................... TO99A0394

(51) Int. Cl.⁷ ............................................. H04L 12/28
(52) U.S. Cl. ................................. 370/395.1; 370/395.5; 370/395.64
(58) Field of Search .................... 370/395.1, 395.51, 370/395.5, 395.52, 395.64, 395.63; 725/91, 93, 95, 96, 114, 116, 117, 138, 144, 146

(56) References Cited

U.S. PATENT DOCUMENTS

| | | | |
|---|---|---|---|
| 5,563,884 A | * 10/1996 | Fimoff et al. | ............ 370/391 |
| 5,583,863 A | 12/1996 | Darr, Jr. et al. | |
| 5,666,293 A | 9/1997 | Metz et al. | |
| 5,666,487 A | * 9/1997 | Goodman et al. | ........ 709/246 |
| 5,742,599 A | * 4/1998 | Lin et al. | ............ 370/395.65 |
| 6,327,275 B1 | * 12/2001 | Gardner et al. | ............ 370/535 |

OTHER PUBLICATIONS

Intellectual Property re–use and System Emulation, IEEE 1999 Custom Integrated Circuits Conf., pp. 91–94.
Digital Audio–Visual Council, High and Mid Layer Protocols, pp. 1 to 145.

* cited by examiner

Primary Examiner—Frank Duong
Assistant Examiner—Melanie Jagannathan
(74) Attorney, Agent, or Firm—Herbert Dubno

(57) ABSTRACT

An RM unit for remultiplexing multi-program audio-video streams transmitted within an switched digital video broadcasting service includes: as, FL1 . . . FLn, MS1 . . . MSn syntactical analysis and reception means receiving plural streams, separating data packets in each stream that can be transported directly to CF, AA, MA, TU means for generating output streams, from service packets that must be transmitted to an MP control unit for processing, in particular for updating service information to reflect the composition of output streams; ME means for temporary storage of data packets, separately for each input stream; and CF; AA, MC, TU output stream generation means that generate and send service users single program output streams or multiprogram streams at a lower band than input streams obtained starting from the packets stored in such ME temporary storage means and from the service packets processed and entered into virtual ATM channels.

20 Claims, 9 Drawing Sheets

ENCODED AUDIO-VIDEO STREAMS REMULTIPLEXING EQUIPMENT

FIELD OF THE INVENTION

This invention relates to a system for transporting and broadcasting encoded audiovideo streams and, more particularly, to a piece of equipment for remultiplexing such streams, that is to say a unit to extract from a stream containing several programs the information related to specific programs and their re-organization into an output stream to be transmitted to users.

BACKGROUND OF THE INVENTION

It is known that an increasing number of encoded audio-video programs (television programs in particular) are transmitted by cable or satellite. The techniques for transporting such programs are governed by international standards, among which series ETS 300 4xx ETSI standards ("Digital broadcasting systems for television, sound and data services . . . ") are mentioned as an example. These standards concern the transmission on the same cable or on the same satellite channel of a certain number of encoded and multiplexed programs in conformity with the procedures established by recommendation ITU-T H222 or standard ISO/IEC 13818, "Information Technology—Generic Coding of Moving Pictures and Associated Audio Information", commonly known as the MPEG2 Standard. This standard defines syntax both for encoded SPTS Single Program Transport Streams and multiplexed MPTS Multiprogram Transport Streams. The standard also specifies the rules for transporting the information on stream content, in particular the PSI/SI Program Specific Information/System Information table. Transport streams consist of 188 byte fixed-length packets that include a header and a data field or payload that can contain either elementary audio-video or table data. In its turn, the header includes a Packet Identifier (PID) whose value is univocally assigned to single elementary streams for the entire duration of a program. A special PID value identifies packets carrying a specific Program Association Table (PAT) containing the information required to
identify the Program Map Table (PMT), which in its turn contains information on the single elementary streams inside a single program. The packet header also contains synchronization information transmitted periodically, including the Program Clock Reference (PCR), which plays an interesting role within this invention.

In conventional cable or satellite broadcastings, the entire stream of multiprograms reaches the home of the user, who selects a program with a special set top box.

The audio-video business is also becoming interesting for telecommunications operators, since optical fiber-based long distance lines feature the capability required for transporting several multiprogram streams on the one hand, and the use of XDSL techniques (Cf. standard ITUT G.992 for the ADSL technique for instance) for transmission on user lines has made capabilities in the range of Mbit/s to some tens of Mbit/s available for supplying users with single audio programs or a limited number of programs on the other. Specification DAVIC 1.1 that can be consulted at Internet site www.davic.org sets the features of a possible service known as Switched Digital Video Broadcasting (SDVB) that telecommunications operators can offer users through fixed web infrastructures.

Program selection in this type of service cannot be allocated to the user unit but must be made by centralized bodies, such as access web nodes for instance, receiving user selection commands and having the capability of identifying and extracting the program elementary streams inside the multiprogram transport stream, and compressing them into a single program stream, then associating this latter with the service information required for proper user decoding and sending it to the user. These operations are completed at one or several points of the web by Broadcast Control Units (BCU) allocated to user command receipt and processing jointly with an Replication Unit (RU) receiving multiprogram streams and distributing them to individual users. The operation whereby a multiprogram stream is split into single program streams or more generally into lower capacity streams is commonly known as remultiplexing.

The devices featuring this function, if necessary jointly with the multiplexing of independent programs in a transport stream or with the addition of programs to a transport stream, are documented and available commercially. U.S. Pat. No. 5,835,493 is mentioned as an example, which describes in detail the problems associated with the remultiplexing of transport streams of the TokenMux unit produced by the Philips Company of Eindhoven, Holland.

The creation of a switched video transmission service further requires adapting MPEG transport streams from service suppliers to the transport technique adopted on the web. A convenient and nearly natural choice for transport is using the ATM technique by inserting each program into a virtual channel. In particular, the choice was made to use the so-called ATM Adaptation Layer level AAL5 defined in ITU-T Recommendation 1.363. In transferring program packets to ATM virtual channels the need arises to check that the peak band for each channel on each of these lines does not exceed the band available on the line itself (typically 8 Mbit/s if an ADSL connection is used). This requires control, known as shaping or leveling, of output streams to level off traffic peaks.

Known remultiplexing devices do not provide direct remultiplexing of MPEG transport streams into ATM virtual channels and the purpose of the invention is to supply an unit capable of transferring an MPEG multiprogram transport stream to an ATM virtual channel and multiplexing virtual channels into virtual itineraries, bearing the band control needs mentioned above in mind.

SUMMARY OF THE INVENTION

The invention provides equipment for remultiplexing encoded audio-video streams transmitted within a switched digital video broadcasting system, each containing multiple programs (multiprogram transport streams), in which program information is transmitted in packets each including a packet identifier supplying information as to the program identity the packet refers to and a payload containing program data or stream structure service information. This equipment comprises syntactical analysis and reception means-circuits (AS; FLI . . . FLn, MSI . . . MSn) suitable to receive a plurality of such streams, separate in each flow packets which can be forwarded directly to
 output stream generation means (CF; AA, MC, TU), from packets which must be forwarded to the said control device (MP) to be submitted to processing, in particular for updating service information to reflect the composition of output streams. Means (ME) for temporary storage of data packets is provided separately for each input stream.

The output stream generation means circuits (CA; AA, MA, TU) generates and sends to users output streams obtained starting from the packets stored in such said temporary memories (ME) and from the processed service packets, such output streams being single or multi-program streams at a lower band than input streams.

The control device (MP) is suitable to receive the service packets from syntactical analysis and reception means (AS; FL1 ... FLn, MS1 ... MSn), to identify individual streams making up the multiprogram streams, to perform updating of service information and drive temporary memory means (ME) and output stream generation means-circuits (CF; AA, MC, TU) so as to enable the creation of single or multi-program streams for different users.

According to the invention such output stream generation means (CA; AA, MA, TU) are suitable to create ATM streams by transferring packets related to the same program or group of programs to ATM cells related to one or more virtual channel and multiplexing such virtual channels into multiple itineraries each containing programs of the same input stream. The output stream generation means circuits (CF; AA, MC, TU) is suitable to perform, during ATM stream generation, a two-step control of the band associated to each ATM stream by reading the packets allocated to different virtual channels in such a fashion as to limit the peak band of each virtual channel to a first programmable value not exceeding the band available on ATM stream transport lines and by performing statistical multiplexing of the virtual channels into virtual itineraries and such that the overall band transmitted to each virtual itinerary does not exceed the peak band available for the itinerary. The temporary memory means (ME) are suitable to store data packets in individual logical queues for a program or group of programs managed by connected lists of pointers each identifying a memory area containing a packet replicated as many times as the number of virtual channels into which a packet is to be entered.

The syntactical analysis and reception means (AS; FLI . . . FLn, MSI . . . MSn) include a group of first memory units (MRI . . . MRn), one for each input stream, suitable for storing for each respective stream a first control word inclusive of a first field containing information on packet validity, a second field active for a valid packet and indicating if the packet is a service or a data packet, and a third field indicating for each data packet into which logical queues it is to be entered, such first control words being prepared and updated by the control device (MP) through continued analysis of the service information contained in the packets supplied to such device (MP) and being read by the input interfaces (FLI . . . FLn) belonging to such said syntactical analysis and reception means (AS; FL1 . . . FLn, MS1 . . . MSn) and each being associated to one of the input streams and therefore to one of the said first memories (MR1 . . . MRn).

These memory means includes and data memory (MD1 . . . MDn) for each input stream and a memory controller (CM1 . . . CMn) for each data memory (MD1 . . . MDn), suitable to dynamically distribute storage capacity among the various logical queues through this management of connected pointer list and inclusive of:

a second memory unit (FF) allocated to store pointers for writing in the free areas of the respective data memory (MD1 . . . MDn) and to issue an indication of the first free pointer based on information received from output stream generation means circuits(CF; AA, MC, TU);

a replication unit (UR), receiving the third control word field from the input interface (FLI . . . FLn) and pointers from the second memory (FF), and replicating a pointer and its related writing command as many times as the number of queues on which a data packet is to be entered;

a logical queue management unit (QM) receiving and storing pointers from this UR replication unit and issuing them at input on request by the output stream generation means (CF); and a pointer freeing control unit (FP) receiving from this replication unit (UR) and storing the identity of the pointers associated to information on the code number associated to a pointer, receiving a message of having read data memory (MD1 . . . MDn) identified by a given pointer from output stream generation means circuits (CF; AA, MC, TU) and suitable to count such reading messages and to issue a free pointer signal once the number of completed readings in the data memory (MD1 . . . MDn) identified by that given pointer is equal to the number of queues for which the pointer is to be used.

The output stream generation means (CF; AA, MC, TU) can include the following:

a third memory unit (TU) that temporarily stores updated service packets supplied by the-said control device (MP) split into as many memory areas as the output virtual itineraries, including, for each area, as many positions as the logical queues completed in such temporary memory means—(ME);

a fourth memory unit (MC) storing a list of second control words each associated to an active virtual channel and containing the input stream identifier and a logical queue of packets to be served at all ATM cell times, the word related to a given virtual channel being entered in the list with a repetition frequency such as to originate, at a given list scanning rate, a peak band not above the said programmable first value; and a packet segmentation unit (AA) that based on the information contained in such said fourth memory unit (MC) is suitable to read from such said data memories (MD1 . . . MDn) data service packets containing updated service information from the said third memory unit (TU), to enter the payload of pairs of packets in a group of ATM cells and to associate a header to each ATM cell and a trailer to each cell group.

The (AA) means (Packet segmentation unit) can include the following:

a first logical network (GD) for managing the dialog between output stream generation means-circuits.(CF) and memory controllers (CMI . . . CMn), suitable to receive such second control words from the fourth memory unit (MC), request the logical queue management unit (QM) to supply the pointers corresponding to the queues to be read and to construct for each virtual output itinerary a list of third control words each containing the corresponding second control word, information indicating whether such said second control word is associated to a service or a data packet, the pointer in case of a data packet and the position of an ATM cell being prepared inside the group of cells where a pair of packets is entered;

a group of fifth memory units (PQ) each suitable to store a list of such third control words; and as-third logical network (DR) for managing requests for packets, suitable to receive the lists of such said third control words, to generate and issue based on information contained in each of such third control words, either the data memory (MD1 . . . MDn) reading addresses corresponding to the source list of such third control word or the third memory unit (TU) reading addresses and to issue such signal of completed reading to a data memory area after reading a pair of packets.

The fifth memory units (PQ) are driven by the said control device (MP), suitable to establish the reading frequency of the third control words inside each list.

The apparatus can include means (CRI, CR2) for updating the value of timing information for each program, present in packets pre-set by the program itself, so as to take account of the variable time for traversing the equipment (RM) by the packets, such updating means-circuits (CR1, CR2) being suitable to calculate a unit traversing time by a packet containing such information, using a clock signal having the same frequency as the system clock signal and generated by an internal oscillator (OL) inside the equipment (RM), to add such time to the value of the said timing information contained in a packet received and entering the resulting total to the packet before sending it to the equipment (RM) output.

The updating means (CR1, CR2) can include a first unit (CR1) belonging to input interface (FLI . . . FLn) and suitable to calculate a preprocessed value of such timing information, represented by the difference between the value contained in the packet received and the value of the instant of the arrival of such packet and to replace it for the values contained in the packet received while this packet travels in the said interface and a second unit (CR2) belonging to the packet segmentation unit (AA) suitable to replace the pre-set value contained in the packet, while traveling inside the same segmentation means, with an updated value represented by the summation of the pre-set value with a value of the packet output instant, the values of the input and output instants being calculated by counters of the first and respectively second units (CR1, CR2), by using the signals of the mentioned local oscillator.

The timing information can be composed of a first part, which evolves at the frequency of said system clock signal, and of a second part, which evolves at a submultiple frequency of the frequency of said system clock signal. The first and second units (CR1, CR2) can calculate a first and a second part of the value of the input and output instants of a packet containing such information and generate as a consequence a first and a second part of the preprocessed value and of the correct value respectively.

The input interfaces (FL]. Fin) can include means (MX2) to receive as an alternative to the said transport streams test streams generated by the mentioned control device (MP) and can also forward test stream packets to the control device (MP) through the mentioned memory means (ME) and said output stream generation devices or through a buffer memory (MT) that temporarily stores the transport stream service packets.

BRIEF DESCRIPTION OF THE DRAWING

To further clarify, reference is made to the enclosed drawings, where.

SPECIFIC DESCRIPTION

Figure 1:
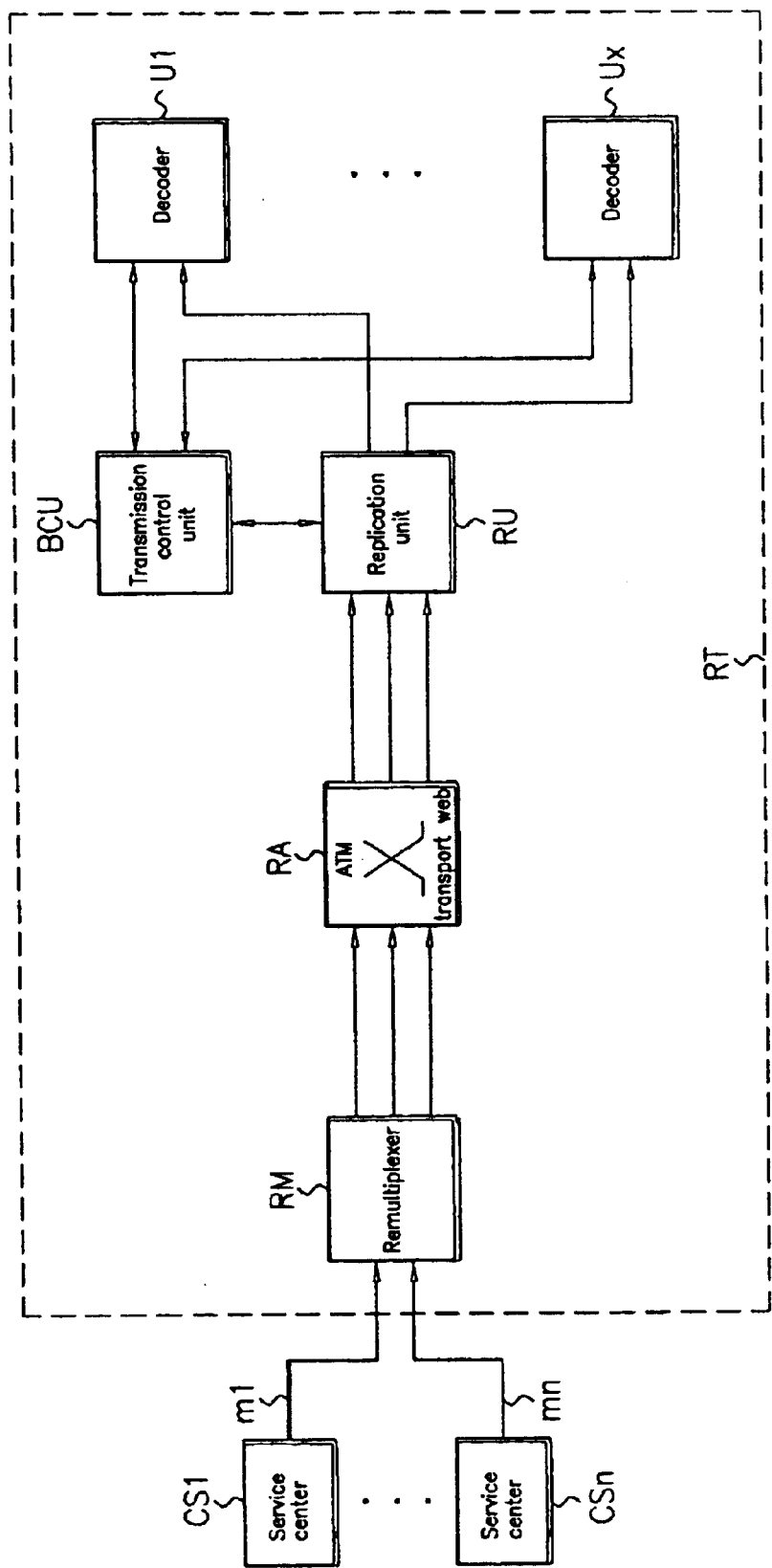
FIG. 1 is a block diagram of the architecture of a switched video broadcasting service using the invention.

With reference to FIG. 1, CS1 . . . CSn indicate a certain number of service centers capable of supplying MPEG-2 multiprogram transport streams transmitted on $m_1 \ldots m_n$ distribution lines in a coaxial or optical fiber cable connecting service centers to an RT telecommunications web. In this web, at the access web termination level or higher hierarchical level transmission node for instance, $m_1 \ldots m_n$ lines are received by an RM remultiplexer covered by the invention, which performs all the operations connected with extraction from the transport stream of all the programs of interest to the various U1 . . . Ux users, program transfer to ATM virtual channel and virtual channel multiplexing into virtual itineraries. The RM remultiplexing unit is shown in the drawing in a central position versus RU replication unit and the BCU transmission control units, only one of which is shown in the Figure, and is connected to the RU units by means of the ATM transport web indicated with RA. Programs are then sent from the RU replication unit to U1 . . . Ux user decoders.

More particularly, the RM unit must perform the following operations for each multiprogram stream received:

identification of programs contained in the stream;

separation of programs into individual single steams and/or their re-aggregation into lower band multiprogram streams with re-calculation and rewriting of the PCR program time reference and replication of the information tables transported in the input stream, adequately updated to reflect output stream composition;

transmission of each flow obtained as above to distinct ATM virtual channels inside the same virtual itinerary by transferring MPEG packets as required by international standards. As mentioned in the introduction, the peak band of each virtual channel during this step must not exceed the capacity of the user line on which they are transported during the last part of the distribution web. In addition, statistical virtual channel multiplexing is also required to ensure that the overall band transferred to the virtual itinerary on which the virtual channels are inserted does not exceed the peak band available for the itinerary itself.

Figure 2:
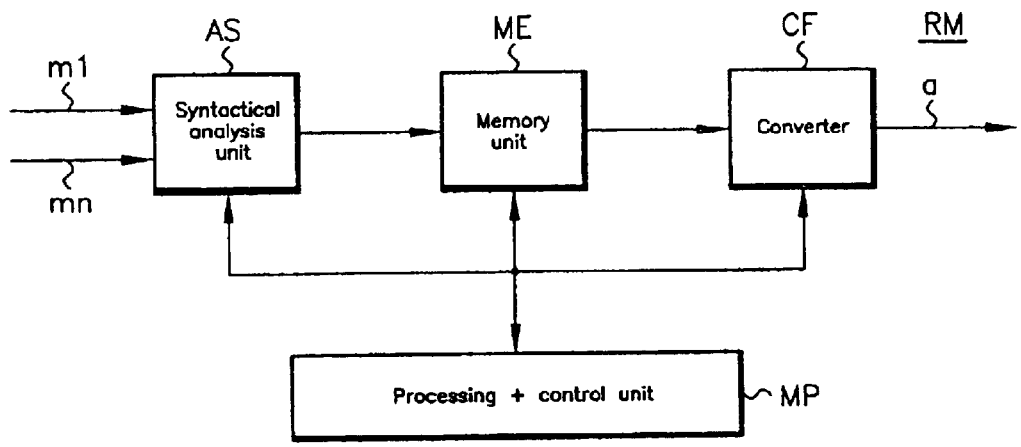
FIG. 2 is a logic diagram of the remultiplexing unit covered by the invention.

The logical structure of the RM unit can be as shown in FIG. 2. The unit includes an MPEG2 stream AS syntactical analysis part that separates for each stream the information that is not to be submitted to processing (typically elementary audio and visual streams and private data) from those that are to be re-processed (particularly the table mentioned above and the data for programs to be replicated in several copies). Hereunder, the information to be re-processed will simply be called "tables" or more generally also "service information". The latter is forwarded to an MP processing and control unit, typically a microprocessor, which produces the updated table replications to be forwarded to each active virtual channel and also generates the header of the new packets in which these replications are to be entered. The information not to be processed is transferred to ME memory units, which organize logical FIFO type queues under MP control separately for each program or group of programs. The CF device then performs actual conversion of MPEG streams into ATM streams, by reading ME queue content, dividing MPEG packets into ATM cells, leveling virtual channels and completing statistical multiplexing inside virtual itineraries.

Transport stream pre-processing devices before the AS block supply packet contents in a form suitable for RM device processing, such as 8-bit words associated with clock signals for instance, to a packet start information and the conventional signals specified by the information exchange protocol adopted. These devices have no influence on the present invention and are therefore not indicated.

Figure 3:
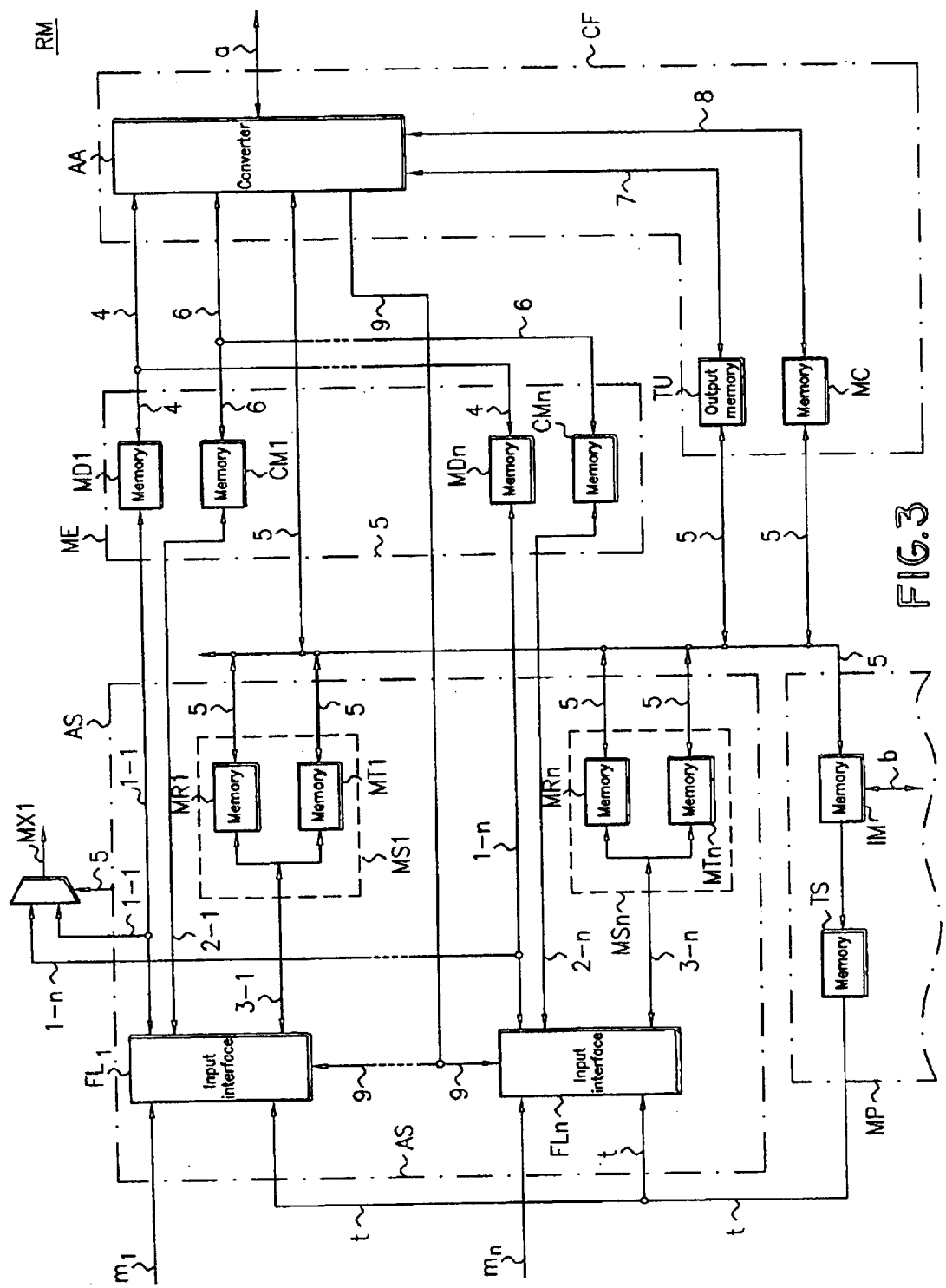
FIG. 3 is a block diagram of the invention.

FIG. 3 shows the RM device structure in greater detail. Incoming transports streams on $m_1 \ldots m_n$ lines are supplied to the FL1 ... FLn input interfaces, hereinafter referred to as "filters", to separate valid packets from those to be rejected, to separate valid packets containing information to be further processed from those not to be and to perform the initial PCR program time reference processing later completed in AA devices preparing ATM streams. Through a 9 connection, the filters receive system clock signals at the same frequency of 27 MHz in conformity with standard MPEGs and synchronization signals for the devices performing this processing. The principles at the basis of the processing performed are illustrated further on.

For syntactical analysis, FL1 ... FLn filters use a control word identified in its MR1 ... MRn search memory using as an address the PID packet identifier contained in the packet header. This word is prepared and updated by the MP control device based on table evolution and contains three fields, the first indicating packet validity and requiring further program data or table processing, or whether it is to be dropped (fill-in packet or packet received during a transitory phase when the microprocessor has not yet acquired the program structure), the second specifying whether the packet refers to a table or program data and the third used for packets containing program data, which include a group of bits each associated to a logical queue for onward packet transmission to the virtual channels involved and indicating whether or not a packet requires entry into its queue by means of its logical value. The association of packets distinguished by the PID identifier and logical queues is constructed and updated by the MP controller based on information on the input stream structure obtained from continuous PSI/SI table analysis.

The FL filter structure will be described in greater detail with reference to FIG. 4.

Packets containing program data are forwarded by FL1 ... FLn filters through 1-1 ... 1n connection to their respective MD1 ... MDn data memories where they are organized into FIFO type logical queues associated to each active virtual channel. Data can also be presented outside for monitoring a particular stream entering from an operator through an MX1 multiplexer, controlled by the MP control device for instance. Data writing/reading in MD1 ... MDn data memories is managed by their respective CM1 ... CMn memory controllers that dynamically share the memory space among the various logical queues by managing linked chains of pointers each identifying a memory segment where an individual packet is entered. As is usually the case for the management of these lists, each includes a head and a queue element updated at each respective writing and reading. After each packet is read, the pointer is normally queued to a list of free memory segments used to identify the positions where incoming packets are to be written. When replication of elementary components of several channels is requested without processing, this replication is performed by acting on the market queues to prevent the need for memorizing several copies of the same packet in MD memories. The requisite number of pointer copies is in practice created for each packet to be replicated at the only MD memory segment containing the packet and each copy is queued to the suitable list. In this case, entry of the memory segment into the list of free segments must obviously only occur when the segment has been read for the number of times established. Necessary information is contained in the third field of the control word sent by FL1 ... FLn to the respective CM1 ... CMn memory controller through 2-1 ... 2n connection on which information to be exchanged between an FL filter and a CM controller have to pass, as will be covered better later. More details on memory controller structure are given at FIG. 5.

Packets containing information to be processed in the MP controller are supplied by FL1 ... FLn filters to an MT1 ... MTn buffer input memory where they are entered in one logical queue. MT1 ... MTn buffer memories and MR1 ... MRn search memories preferably physically consist of two halves belonging to a same MS1 ... MSn service memory. This simplifies unit structure. The drawing therefore only shows one 3-1 ... 3-n connection between an FL1 ... FLn filter and its MS1 ... MSn service memory. Access to an FL filter to MR or to MT will depend on the phase of the operation.

The MP controller through an internal bus 5 of the unit and an IM interface connected to MP controller bus b then read tables stored in MT1 ... MTn buffer memories. As said, the controller uses the information contained in the tables to update the control words to MR1 ... MRn memories. In addition, after a complete version of these tables has been obtained, MP constructs an updated replication to be sent to active virtual channels. These replications are distributed in the payload of suitable packets in conformity with the transport stream syntax, which the controller also constructs the header for. Packets with tables are then entered in suitable logical queues of a TU output memory, which is divided into n areas biunivocally corresponding to FL input interfaces and includes inside each area a position for each of the logical queues made in the corresponding MD data memory. The MP controller will also establish the table emission sequence and frequency on a 7 connection per AA entry into the suitable ATM cells. It should be noted that the MP controller acts in parallel on all streams present at RM input and, similarly, the TU output memory organizes the logical queues of table packets for all virtual itinerary channels.

MD data memory outputs are connected to block AA that performs real and proper conversion of MPEG streams into ATM streams. Block AA, which will be described in greater detail with reference to FIG. 6, can read data from the MD memory one at a time and these outputs will therefore advantageously make up a bus structure. For drawing simplicity, only one bus 4 has been shown for transferring data from MD memories to AA and for exchanging the signals such as addresses, control and information exchange protocol signals connected to this transmission between MA and AA. A similar bus 6 structure is provided for the transmission of reading and address control signals from AA to the memories and for exchanging information in between block AA and CM memory controller. Block AA segments the packets organized with ATM cell transport stream syntax in conformity with the provisos of AAL5 protocol and shares the band among active virtual channels in two steps. In the first step, AA limits the peak band of each virtual channel in a programmable mode and performs multiplexing of data on elementary streams extracted from MD memories and on updated tables supplied by TU through suitable connection 7 wires into virtual channels. In the second step, virtual channels are statistically multiplexed into virtual itineraries by limiting the peak band of the latter to a programmable value. ATM streams prepared by AA are then issued through output a by standardized interfaces, known as UTOPIA, not represented. For these operations block AA co-operates with an MC leveling memory storing the information that enables identifying the input stream and the queue to be served for each ATM cell time. This information is supplied by MC to AA through a connection 8.

More in particular, the MC memory stores a list of output tokens for transmission individual ATM cells to the unit output, each token being related to a specific active virtual channel. The token can merely consist of a two-field word, one for identifying the input memory and therefore the MD memory where the queue for that channel is organized and the other the logical queue. Frequency of the list of tokens for a given virtual channel and the list-scanning rate determine the peak band that can be allocated to that channel. It must also be borne in mind that, in conformity with AAL5 standards, each Protocol Data Unit PDU must contain the data for two MPEG packets, which can be transferred to eight ATM cells and that eight tokens must therefore be read for each virtual channel.

To be able to handle variations in the packet multiplexing law within the respective virtual channels, which may prove necessary following modifications in the composition of the multi-program stream input to the RM equipment, the MC memory is sub-divided into two parts. These are organized in ping-pong fashion, one of which contains the current state of the token sequence, to be used in the current frame, and the other contains the future state of this sequence, prepared by the controller following detection of said modification of the stream composition.

Block AA also completes processing of PCR reference values required for their re-calculation. This re-calculation is necessary to eliminate or minimize a non-negligible source of packet jitter from a transmitter to a receiver and thereby make it possible to synthesize at the receiver a time base synchronous with that of the transmitter by means of a phase hookup circuit or PLL operating starting from the sequence of PCR values. Processing essentially consists in identifying the variable time each packet containing PCR data remains in the RM block and consequently updating the PCR reference value in the packets issued. This time should strictly speaking be estimated by using a clock synchronous with the one having originated the PCR itself, but this would imply the use of as many PLLs, similar to those used at the receiver, as the programs with distinct system clocks. Remarkable complexity reduction is obtained by measuring time with one counter boosted by a local oscillator at the same rated frequency as the system clock. As long as local oscillator precision and stability are the same as the one used for the transmitters, errors introduced into the measurement of time intervals are such as to be easily absorbed by the receiver PLL. Transmission time calculation could theoretically require storing the instant at which each PCR sample enters the unit, associating this instant with the sample itself, recording the instant it leaves the remultiplexer, calculating time elapsed and correcting the sample value to this measurement. This procedure would be ineffective for two reasons:

memory would have to be reserved for coding the instants of entry into the PCR and the size of this memory would be hard to estimate a priori as it is impossible to predict the maximum number of PCR samples simultaneously present inside the unit at each instant;

association between the samples enter instants and the samples themselves would be difficult to maintain.

The solution adopted avoids both drawbacks mentioned above and as said a two-step correction procedure is provided, one of which in completed in FL blocks and the other in block AA. The corrected $PCR_{OUT}$ is calculated based on the equation:

$$PCR_{OUT}=PCR_{IN}+(T_{OUT}-T_{IN})$$

where $PCR_{IN}$ is the value contained in a packet received and $T_{IN}$, $T_{OUT}$ are the packet input and output instants calculated by using the local oscillator. In practice, a value of $PCR_M=PCR_{IN}-T_{IN}$ is calculated in FL filters and a value of $PCR_{OUT}=PCR_M+T_{OUT}$ is calculated in block AA. The preferred implementation of correction means will be described later on.

It should also be added that besides the streams present on MI . . . Mn lines, the unit can also receive test streams prepared by the MP controller. These streams are read in a special TS memory and reach the FL filters through a t line. They can then be retrieved either at MT buffer memory or at block AA output to be returned to the MP controller.

Figure 4:
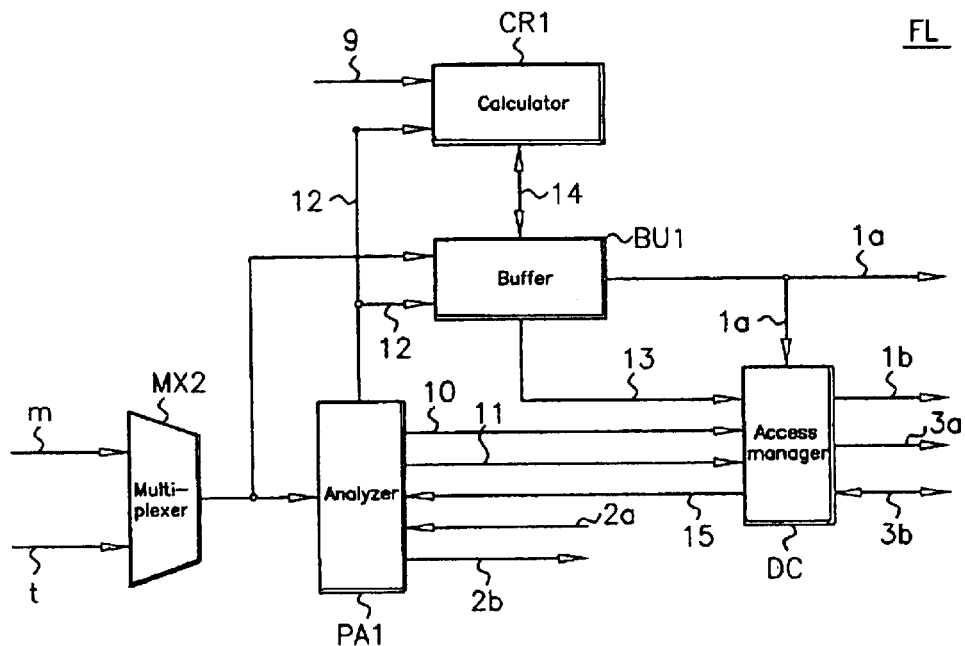
FIGS. 4 to 6 are the diagrams for some items of the unit shown in FIG. 3.

With reference to FIG. 4, an FL filter essentially consists of:

a PA1 state machine making up the real and proper syntactic analyzer which, as said, must discriminate between valid and invalid packets and between packets carrying program data or tables;

a CR1 block for calculating the value of PCRM as specified above;

a BU1 buffer memory essentially structured as a sliding register bench for temporary storage of packet streams during FL filter operations. Packets are then issued by BU1 on wires 1 a of the connection shown in FIG. 3;

a DC device for managing access to the MD data memory and the MS service memory;

an MX2 multiplexer for supplying PA1 and BU1 with the packet of programs present on line m or the test packets present on line t.

The PA1 state machine, as said, operates starting from analysis of the PID packet identifier and the control word associated to the packet and read in the service memories. It generates:

a control signal on wire 10, which is supplied to DC to enable the filter to access the MS service memory or the MD data memory. During the initial stage of operations on a packet and particularly until PA1 recognizes the type of packet, the control signal value enables access to the service memory, in particular to the MR search memory section;

a TABADD signal on wire 11, used by DC to generate the reading/writing addresses in the above memories;

control signals on the wires indicated with 12 for writing/reading BU1 buffer memory data, for transfer from BU1 to DC of the PID packet identifier with connection 13 and control signals for transfer from BU1 to CR1 of the PCR signal to be updated and for transfer from CR1 to BU1 of the PCR signal processed in CR1, with connection 14.

PA1 also receives:

the control word from DC through a connection 15;

a pointer for writing data in the memory that will be used for generating the actual writing address from CM through wires 2a of connection 2 (Cf. FIG. 3).

In addition, in the case of a packet containing data, it returns the third field of the control word containing information on the logical queues to activate to CM through wire 2b of 35 connection 2.

By using PID identifier and/or the TABADD signal respectively present on connections 13 and 10, block DC generates the addresses for access to MR or to MT or MD, according to packet phase and type. Addresses for access to MD are presented on wires 1b of connection 1; those for access to MR or MT on wires 3a of connection 3. In addition, through wires 1 a, it receives from BU1 the packets to be sent to MT and presents them on wires 3b with 16-bit parallelism for instance. In the direction of DC the same group of wires 3b is used to supply DC
with the control word to be forwarded on connection 15. It should be noted that the drawing does not show the conventional signals related to the dialog protocol with a memory, such as chip selection, valid data, reading/ writing and the like, as they are of no concern for understanding the invention.

Filter operation is as follows: when receiving an MPEG packet, the PA1 state machine remains at rest while awaiting recognition of the arrival of the PID packet identifier. Once the PID is recognized, the PA1 commands its reading in BU1 and transfer to DC, which uses it as the reading address in MR of the control word associated to that packet. Based on the contents of the control word, PA1 enables DC to manage access to MT or MD, or, if the packet is insignificant, return to rest. If the packet is to be supplied to the MP controller, the signal on wire 10 continues to remain at the logical value necessary for access to the service memory. In addition, the packet is transferred by BU1 to output 1 a and passed to DC that forwards it to MT where it is written at the address generated by DC on connection 3a. If the packet is a data packet, based on the value of the pointer supplied by CM on wire 2a, PA1 generates a suitable value for TABADD. The signal on wire 10 is switched to enable DC to access MD. The packet is forwarded by BU1 to MD and will be written at the address generated by DC on connection 1b. When a packet with a PRC sample is recognized, PA1 commands extraction of the sample from BU1 and its transfer to CR1 for PCRM calculation. The value of PCRM is then re-entered into the same BU1 buffer memory before forwarding the packet downstream.

In the case of test packets, operations follow the same procedure as for packets coming from service centers. The only difference is that even if they are data packets they can be forwarded either to ME or to DC according to whether the test packets are to be read at AA output (Cf. FIG. 3) or picked up by MT.

Figure 5:
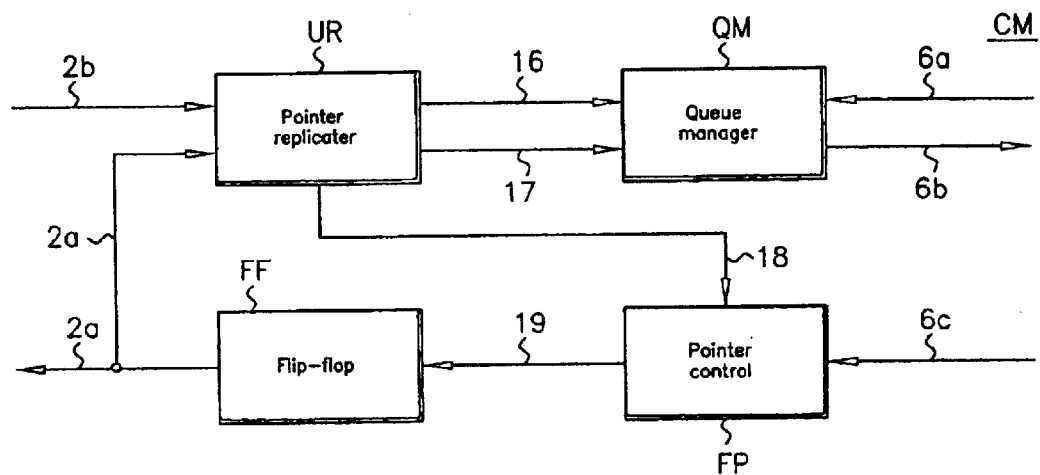

As shown in FIG. 5, a CM memory controller essentially consists of:

an FF memory allocated to store pointers for writing in the MD data memory;

a UR unit allocated to replicating a pointer as many times as the queues in which a program data packet is to be entered;

a QM unit for managing the logical queues in the MD data memory;

an FP unit for controlling pointer freeing.

The FF memory is a conventional FIFO memory containing a list of pointers corresponding to free MD memory areas. Each pointer selects a memory area sized to contain an MPEG packet. This memory is initialized to contain the list of all possible pointers (128 for instance) and based on the updating information supplied by the subsequent block AA (Cf. FIG. 3), it generates an indication as to the indication by the first free pointer and presents it to output 2a for transmission to block PA1 (Cf. FIG. 4) of filter FL and to block UR of the same CM controller.

Unit UR receives the third field of the control word containing indication of the queues in which the packet is to be entered from block PA1 (Cf. FIG. 4) through wires 2b, and from FF memory the pointer to the MD memory area where the queue is organized and then sends to the QM queue manager through connections 16 and 17 the pointers and commands for their writing in the queues, replicating them as many times as the active queues for that packet. This enables storing the packet only once in MD regardless of the number of users the packet is to be supplied to. UR also supplies, on an output 18 connected to the pointer freeing control FP unit information of the number of queues and therefore replications.

The QM unit completes a series of queues organized according to a FIFO type procedure by storing the pointers supplied by UR. Since each AAL5 protocol PDU must contain two MPEG packets, as mentioned earlier, each QM queue shall be considered as empty until it contains a pair of pointers. QM receives from AA (Cf. FIG. 3) the requests for reading of a specific queue through wires 6a of connection 6 and supplies AA with the pair of pointers at each request through wires 6b of the same connection 6 together with the indication of their actual validity (queue not empty). The techniques for developing a device performing QM functions are well-documented.

The FP block is a memory containing pointer identifiers and is associated with a counter initialized with the value supplied by UR through connection 18 and is decreased whenever AA completes an operation affecting the memory area identified by a pointer. For this purpose FP receives from AA through wires 6c of connection 6 signals indicating completion of access to the memory area indicated by the pointer by issuing the information of free memory area when the counter reaches 0 on output 19 to FF.

Figure 6:
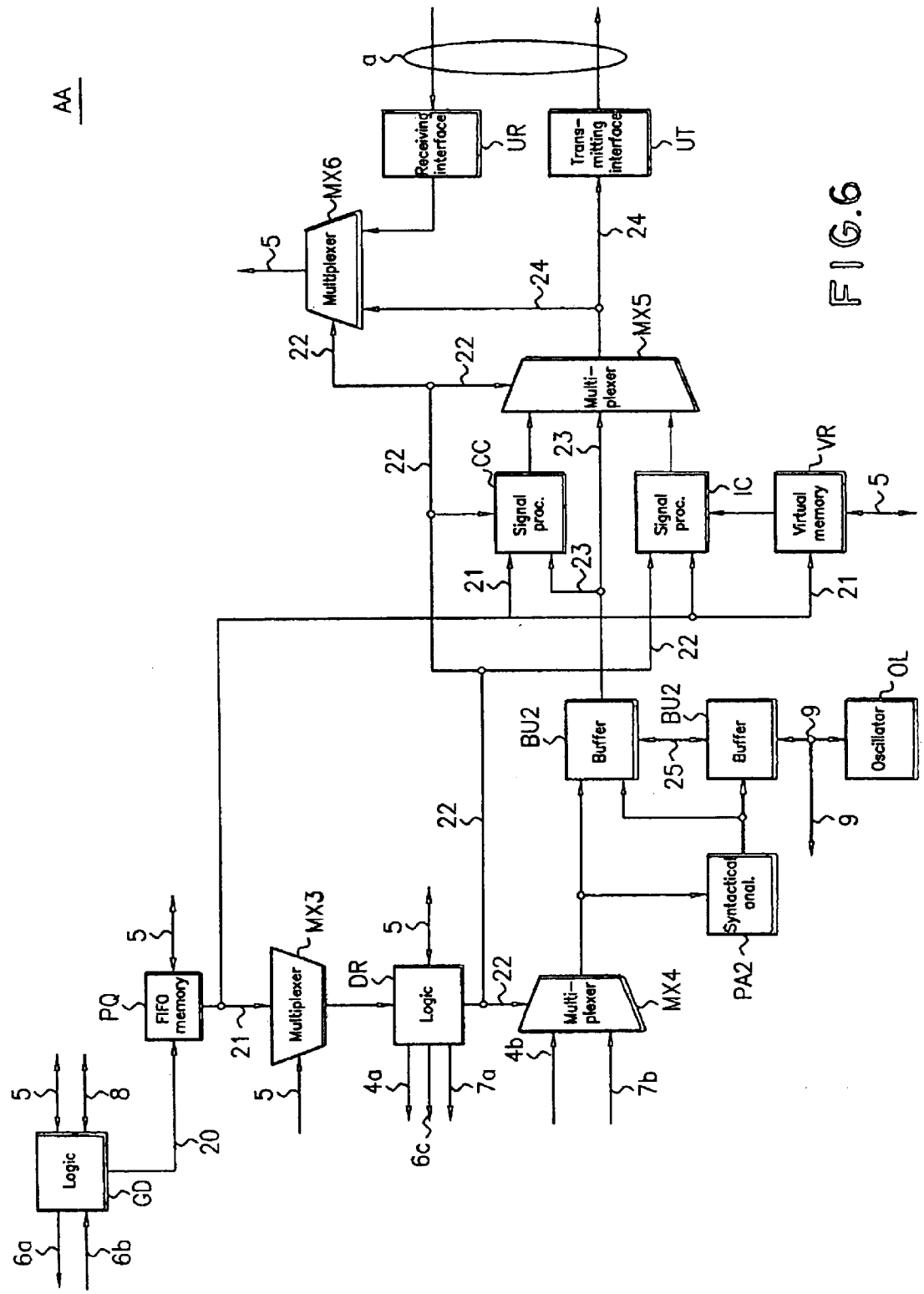
Figure 7:
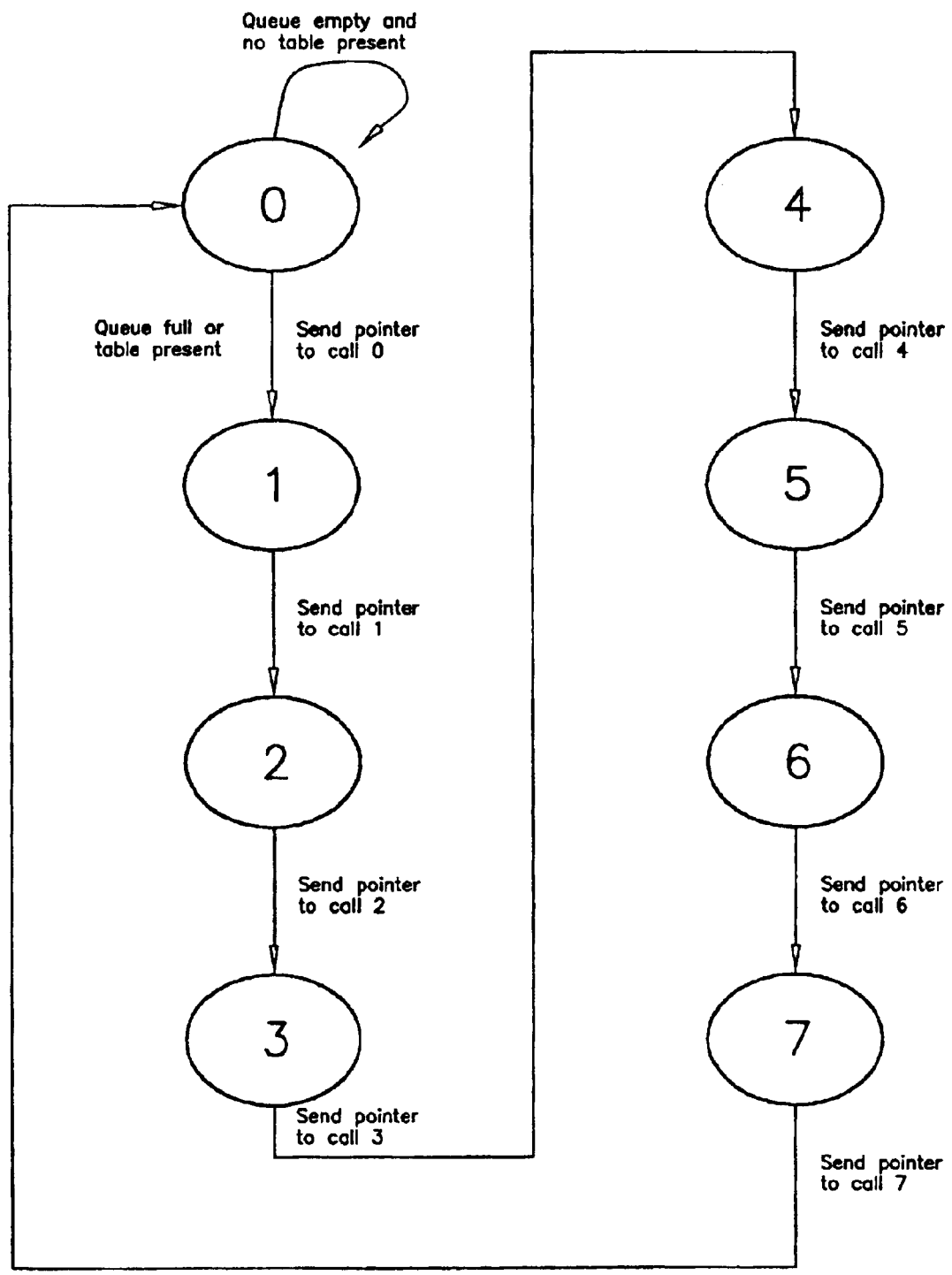
FIG. 7 is a state diagram of a logical web.

With reference to FIG. 6, a logical GD network in block AA for managing dialog with CM memory controllers (Cf. FIG. 3) receives tokens from MC through connection 8 and when the first token of the group of eight related to a virtual output channel is read, through wire 6a it asks the QM logical queue manager (Cf. FIG. 5) in the CM controller involved for the pointers related to that channel. If the queue is not empty (that is to say if at least two pointers are present in QM Cf. FIG. 5), these pointers are entered by GD into an information word or permit together with the source program stream and queue identifier (that is to say the information contained in a token), with an indication that the token is associated to program data and with information on the position of the token in the group of eight. If the queue is empty (that is to say that it is recognized by GD thanks to a signal also present on wires 6b) and there are tables associated to that virtual channel (which is signaled by the controller through bus 5), the indication that the token is associated to a table is entered in the permit in addition to the source program stream and queue identifier. In practice, the GD logical network is a state machine replicated as many times as the number of possible logical queues and it operates in conformity with the state diagram of FIG. 7 related to queue x for each queue. Passage from one state to another is determined by reading the token of the respective queue.

The permits created by GD are entered unto one of n permit queues, each associated to a virtual output itinerary, in its turn univocally associated to one of the input streams. These permit queues are organized into a group of n FIFO memories indicated overall with PQ, which receive them from GD through connection 20. Permits are supplied by PQ memories to a DR logical network managing data requests through connections 21. Based on the information contained in a given permit, the DR logical network generates three memory addresses in one of the MD memories (Cf. FIG. 3) on wires 4a of bus 4 or the reading address in memory TU on wires 7a of connection 7. An MX3 multiplexer enables selection of one of the PQ memories. DR logic consequently commands positioning of an MX4 multiplexer on a first input connected to wires 4b of bus 4 or a second input connected to wires 7b of connection 7 for AA to receive tables or program data.

At packet reading end that is signaled by the controller, DR issues the pointer-freeing signal on wires 6c. Permits are read by the respective queues with a frequency programmable by the MP controller. Alternation of n queues is cyclical. Access to TU is also periodic after reading a certain number of pairs of data packets.

The information contained by a token that identifies a logical queue is also transferred to IC, CC units allocated respectively to construct the ATM cell header and protocol unit trailer and is also used to address a virtual VR memory containing information on associations between logical queues and virtual channels/itineraries to be entered into a cell header. MP loads the necessary information into VR. Connection 22 also carries command signals to blocks IC, CC.

The data or tables are supplied by MX4 to a second BU2 buffer memory similar to BU1 (Cf. FIG. 4) and to a second PA2 syntactical analyzer that in the case of programs has to recognize the presence of the PCR identifier inside packets and command its transfer from BU2 to the CR2 devices that perform the second part of processing required for PCR by calculating the value of $PCR_{OUT}$ and replacing it in place of $PCR_M$ before packet transfer downstream. The data from BU2 are supplied through a connection 23 to the first output of another MX5 multiplexer provided with two other outputs respectively connected to IC and CC for output transfer of cell header or payload at the proper instants and the cell trailer at cell end. The MX5 too is commanded by signals issued by DR on connection 22. Output 24 of the MX5 is then connected to the UT transmission UTOPIA interface and thus to device output a.

It is pointed out that in accordance with AAL5 specifications the trailer occupies a certain number of words of the last data unit cell and DR thus commands reading a different number of words in MD according to whether it is reading one of the first 7 cells or the last one of a group of 8 and that it must also receive from the other CC the data present on connection 23 to complete the last cell.

MX5 output 24 is also connected to bus 5 through another MX6 multiplexer that can alternatively receive ATM cells for diagnostic purposes to be sent to the controller through the UR receiving UTOPIA interface. Test packets generated by TS can thus be transferred to MP (Cf. FIG. 3).

Figure 8:
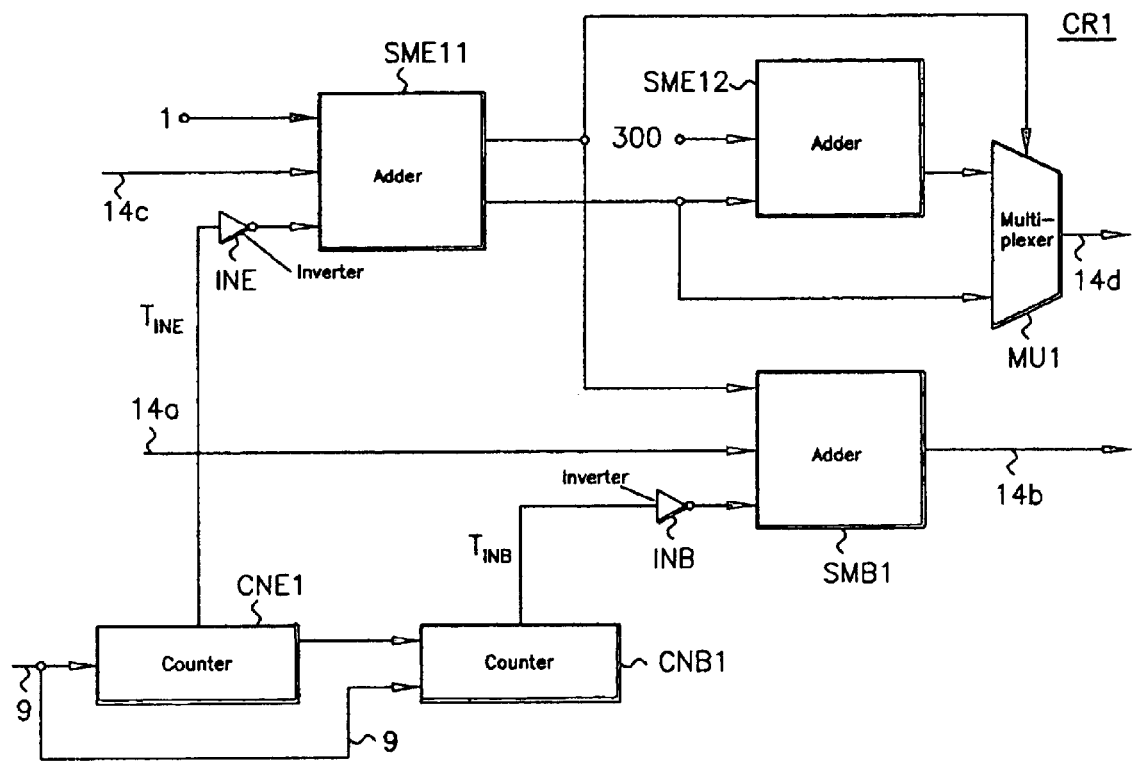
FIGS. 8 and 9 are layouts of recalculation devices for the program clock reference.
Figure 9:
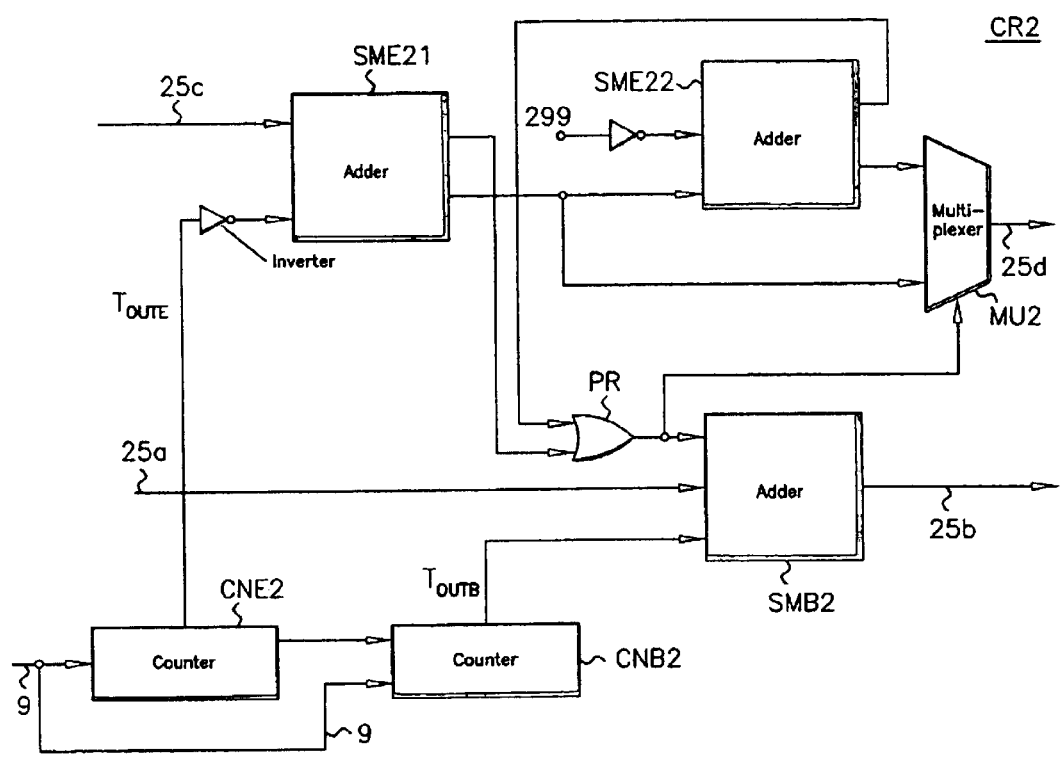

To return to the processing of PCR samples, circuits CR1, CR2 illustrated in FIGS. 8 and 9 take account of the need to maintain compatibility with MPEG1 (ISO/IEC 1172) standard requiring a clock signal at the rated frequency of 90 KHz (1/300 of 27 MHz). This is why the PRC value includes two parts, one consisting of 33 bits evolving at the frequency of 90 KHz ("base" frequency as indicated in the following as subscript case letter B) and the other of 9 bits evolving at the frequency of 27 KHz ("extension" frequency as indicated in the following as subscript letter E). General PCR(i) sample related to instant t(i) can thus be expressed as:

$$PCR(i)=PCR_B(i) \times 300 + PCR_E(i)$$

The difference $PCR_M = PCR_{IN} - TI_N$ is achieved on the two $PCR_E$ $PCR_B$ parts at 9 and 33 bits taking account of negative carryover if the 9-bit part of the subtrahend is greater than that of the minuend and operating with a suitable word length. The following will be obtained, in particular:

$$PCR_{ME} = (PCR_{INE} - T_{INE}) \bmod 300 \text{ and} \tag{1}$$

$$PCR_{MB} = (PCR_{INB} - PCR_{INB}) \bmod 2^{33} \text{ if } PCR_{INB} \geq T_{INB} \tag{2}$$

$$PCR_{MB} = (PCR_{INB} - PCR_{INB} - 1) \bmod 2^{33} \text{ if } PCR_{INB} < T_{INB} \tag{3}$$

Having premised the foregoing, as seen in FIG. 8, circuit CR1 includes a pair of counters in CNE1, CNB1 sequence, the former being a 9-bit module 300 counter generating $T_{INE}$ and the second a 33-bit module $2^{33}$ enabled for carryover from the former and generating $T_{INE}$. The value of $T_{INE}$ inverted in an INB inverter is supplied to a 33-bit SMB1 adder that receives from BU1 (Cf. FIG. 4) through wires 14a of connection 14 the value $PCR_{INE}$ and generates the value of $PCR_{ME}$ through wires 14b to be sent to BU1. Calculation of $PCR_{ME}$ can be performed with two module 9 adders in cascade, by using the well-known fact that in general:

$$(A-B) \bmod K = (A-B) \bmod 2^J$$

$$(A-B) \bmod K = [(A-B) \bmod 2^J + K] \bmod 2^J = [(A + notB + 1)] \bmod 2^J \text{ if } A < B \tag{5}$$

where $2^J$ is the power of 2 immediately greater than K. In the case in point, $A = PCR_{INE}$, $B = T_{INE}$, $K = 300$, $J = 9$. The two module 9 adders are shown in the Figure as SME11, SME12. The former receives $T_{INE}$ from CNE1 inverted in an INE inverter and $PCR_{INE}$ from BU1 (Cf. FIG. 4) and the latter the result $PCR_{MEP}$ of the summation performed in SME11 and calculates equation (5). An MU1 multiplexer enables supply of $PCR_{ME}$ on wires 14d of SME11 or SME12 output. MU1 multiplexer is driven by the carryover of SME1, which is 1 or 0 according to whether (4) or (5) applies.

The equation $P\ CR_{out} = (PCR_M + T_{out})$ must be similarly calculated on the two 9 and 33-bit parts by adding module 300 of the 9-bit parts and taking account of any positive carryover in summing the 33-bit parts. In particular the following are obtained:

$$PCR_{OUTE} = (PCR_{ME} + T_{OUTE}) \bmod 300 \text{ and} \tag{6}$$

$$PCR_{OUTB} = (PCR_{MB} + T^{+1}_{OUTB}) \bmod 2^{33} \tag{7}$$
$$\text{if } PCR_{ME} + TOUTE \geq 300$$

$$PCR_{OUTE} = (PCR_{ME} + T_{OUTE}) \bmod 2^{33} \tag{8}$$
$$\text{if } PCR_{ME} + TOUTE < 300$$

Complementary considerations to those for calculating $PCR_{ME}$ can be made for calculating $PCR_{OUTE}$ and for identifying the condition for selecting the equation for $PCR_{OUTS}$. CR2 (Cf. FIG. 9) thus includes CNE2, CNB2, SMB2, SME21, SME22, MU2 elements corresponding to CNE1, CNB1, SMB1, SME11, SME12, MU1 elements of FIG. 8 and connected as they are. The differences are that inverters are not provided on counter CNE2 and CNB2 outputs and that multiplexer MU2 is controlled by a PR gate that combines in OR the carryover outputs of adders SME21, SME22. In particular, MU2 selects as $PCR_{OUTE}$ the value supplied by SME21 when PR output is 0 and the value supplied by SME22 in the opposite event. In actual fact, by indicating with $CR_E$ the output signal of gate PR, it can immediately be seen that the following are obtained with the circuit diagram of FIG. 9:

$$PCR_{OUTE} = (PCR_{ME} + T_{OUTE}) \bmod 2, \text{ if } CR_E = 0$$

$$PCR_{OUTE} = (PCR_{ME} + T_{OUTE} - 299) \bmod 2^9 \text{ if } CR_E = 1$$

$$PCR_{OUTE} = (PCR_{MB} + T_{OUTE} + CR_E) \bmod 2^{33}$$

Wire groups 25a, 25b, 25c, 25d respectively correspond to wire groups 14a, 14b, 14c, 14d.

It should be noted that the two circuits CR2, CR1 operate in a CR2 master–CR1 slave configuration so CR2 will send CR1 the synchronization signal mentioned in connection with FL filters and not shown in FIGS. 8 and 9.

Figure 10:
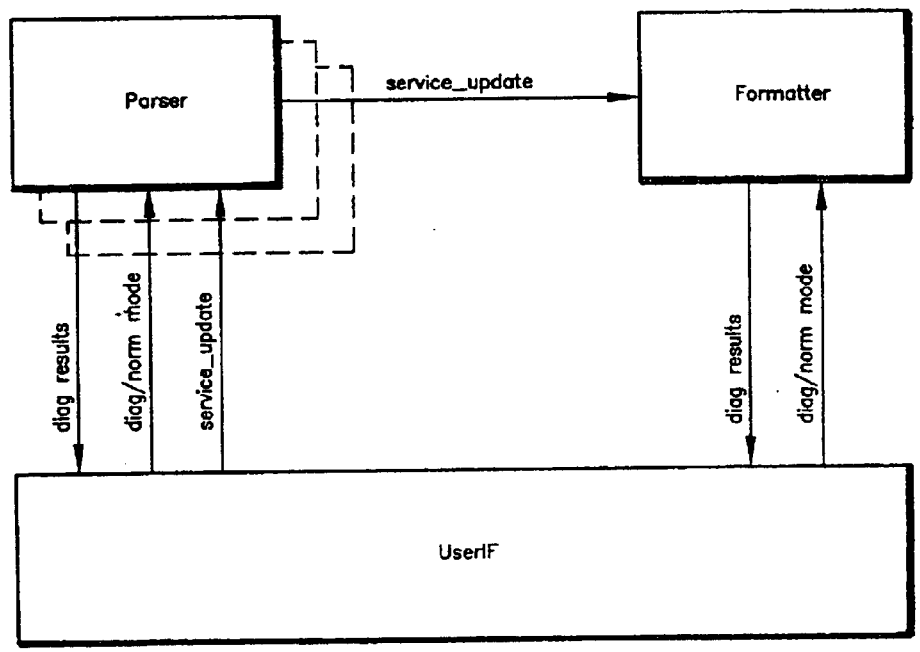
FIGS. 10 and 11 are diagrams of the control device program organization.
Figure 11:
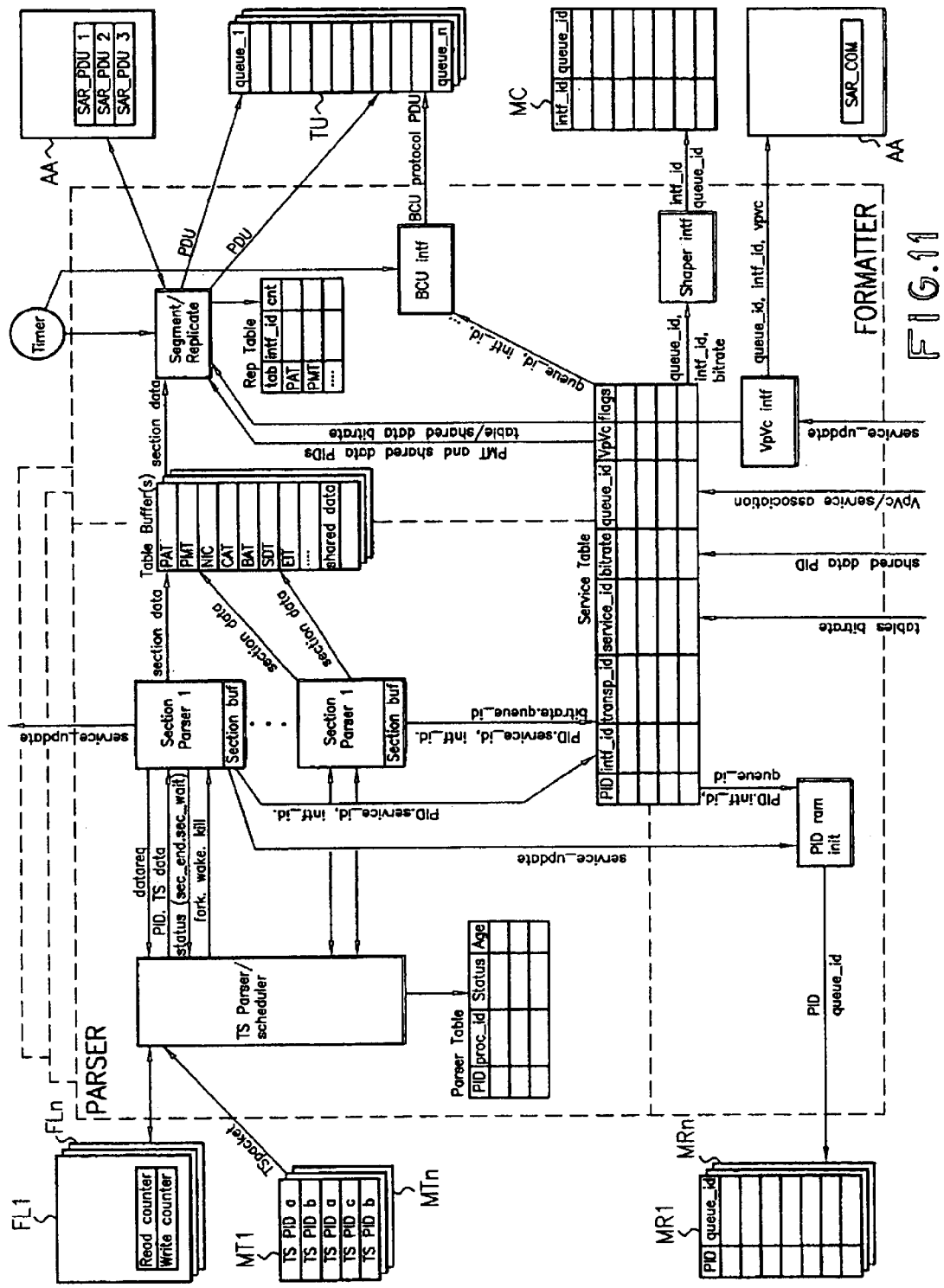

To complete the description of the unit functional blocks some details will now be given on MP controller operations, also referring to FIGS. 10 and 11.

The controller is programmed to supply the following functions:

Processing PSI/SI tables; in particular this involves:

reconstructing and interpreting PSI/SI tables with identification of MPTS multiprogram transport streams at RM unit input (Cf. FIGS. 1–3)

identifying the nature and composition of MPTS/SPTS multi or single program transport streams at RM unit output, updating tables and their.replication; segmenting tables into transport stream TS packets and their entry into TU (cf. FIG. 3) with a suitable frequency;

generating communication protocol messages to the BCU unit (Cf. FIG. 1). This feature is tied to RT telecommunication network management specifications (Cf. FIG. 1) and does not concern the invention.

Configuration and control of hardware models.

This in particular involves:

programming FL, CM, AA blocks (Cf. FIG. 3) initializing and dynamically controlling MR search memories and leveling memory MC;

managing automatic diagnosis procedures or those requested by the system operator (test streams generated by TS);

controlling interaction with the system operator who can act on all hardware configuration and control operations listed above and on the configuration parameters related to PSI/SI table processing.

The architecture If the hardware processes being executed on the controller includes three sub-systems: PARSERS, FORMATTER and USERIF, shown in FIG. 10 together with the main messages/commands exchanged among them. Data transfers among sub-systems are by shared memory areas (Service Table, Table Buffer, the structure of which is shown in FIG. 11), containing all the information related to program detected at input and programs to be produced at output.

The PARSER sub-system contains a unit for each input interface and therefore for each virtual output channel. One unit reads packets containing PSI/SI table s in the corresponding MT memory, reconstructs a complete copy of them and monitors any updating. Information on the multiprogram stream structure obtained from the tables is communicated to the FORMATTER sub-system (service_update).

Based on the rules for constructing RM unit output programs set by the web manager, the FORMATTER sub-system (of which there is one for all input interfaces/active virtual channels) performs updating and replication of the PSI/SI tables formation of the MPEG packets into which there are segmented and sent to TU (Cf. FIG. 3). The sub-system also manages updating of the MR memory involved, of MC and VR (Cf. FIG. 6), as well as the creation and transmission of unidirectional communication protocol messages to the BCUs.

The USERIF sub-system manages exchanges with the operator of messages where the various system parameters are configured and their operation conditions are identified.

In particular, with reference to the two PARSER and FORMATTER sub-systems, which are those mostly involved in RM operations, reference will be made to FIG. 11 where the thick lines Indicate data flow and thin lines indicate command streams. For clarity, the circuit elements involved are also shown, indicated with the same references as used in FIG. 3 and represented by dashed lines outside the frame.

1) PARSER sub-system

The PARSER sub-system consists of a constantly active analysis and programming process (TS Parser/Scheduler) and one or more dynamically created and destroyed programs (Section Parser). The TS Parser/Scheduler process in its turn consists of two TS Parser and Schedule sub-processes. The TS Parser process reads from MT Cf. FIG. 3) the packets from which it extracts and interprets the header fields. The data contained in the packet payload and its PID identifier are made available to the Section Parser processes requesting them. Header data are processed by the Scheduler sub-process.

Section Parser processes operate reconstruction of PSI/SI tables. Each prosess manages one table section by reconstructing it and entering it into the Table Buffer area. When activated, a Section Parser sends a request for data on a specific PID indicated in the activation command generated by the Scheduler to the TS Parser and proceeds with reconstruction of the segmented table in the packets identified by that PID. The process remains active until momentary exhaustion of input data related to the PID processed, that is to say until the end of the section being reconstructed. In the first case, the process sends the Scheduler a sec_wait message and goes to sleep. In the second case, it informs the Scheduler of its availability to process other PIDs by sending a sec_wait end message and again going to sleep. The sections complete with tables are entered into the Table Buffer with an associated indicator signaling output replication (duplication or updating) request mode and information (offset of field to be changed and the like), targeted at minimizing syntactical analysis functions in the FORMATTER sub-system. The TS Parser sub-process communicates to the Scheduler sub-process the PID of each input TS packet received. The Scheduler, based on a local information table (Parser Table), selects the particular instance of the Section Parser process to be activated or, in the absence of process instances awaiting data related to the PID or free process instance, dynamically creates a new one. The activated Section Parser sends a request for data for the current PIS to the TS Parser and proceeds as described above, A suitable field (Age) of the Parser Table enables completing an automatic removal mechanism of process instances no long necessary.

The Section Parser process allocated to reconstructing the PAT table (Section Parser 1) enters into the Service Table the PID identifiers of packets containing the PMT Program Map Table and sends the PID RAM Init function of the FORMATTER sub-system the command service_update, to suitably initialize the MR memories. (It should be noted that the PIDs related to the PMT tables, unlike the PIDs of the PSI/SI tables, are not known in
advance but must be obtained from the PAT).

Besides entering the above table into the Table Buffer, the Section Parser process allocated to reconstructing the PMT table (Section Parser n) also enters PIDs into the Section Table, the input interface identifier (intf_id) and the bit rate of each program (identified with a distinct service_id), described in the PMT table. The process also completes part of the PID RAM Init function as it initializes the identity field of the logical queue (queue_id) for each new service_id. Any change to the Service Table generated by updating the PSI/SI tables causes a service_update command to be sent to all the software sub-systems involved.

2) FORMATTER sub-system

The main body of the FORMATTER sub-system consists of the Segment/Replicate function that deals with actualizing and replicating the tables written by the Section Parser in the Table Buffer, segmenting them into TS packets on the MT memory output queues. According to program type and composition tables can be replicated without changes, with minimum changes or generated new (as for example in the case of some Service Description Tables), by using the information included into the Table Buffer by the Section Parsers.

The function generates tables with a high rate of configurable repetition by using an internal Timer for generating suitable time widows. Access to MT is managed by semaphores allocated in registers of the component completing MT. The Rep Table is used to count the number of windows actually used for each table and to enter any correction to the replication algorithm. (It should in fact be noted that block AA may be unable to program the output of TS packets related to tables within the time window provided).

Each MT queue contains a PDU data unit consisting of two TS type packets. The Segment/Replicate function must therefore also perform segmentation of the table sections into 188-byte TS packets (also entering the headers required by applicable standards) and aggregate two TS packets into one PDU.

The PID RAM/nit function manages the MR memories used by FL filters. The function initially only stores the PID identifiers known in advance based on the syntactical rules governing the stream and related to some PSI/SI tables. As the PAT table is reconstructed, that is to say whenever it receives the service_update command from the Parser process, the function updates the NR memory with the PIDs related to the (new) programs.

The VpVc Init function uses Service Table data to initialize the tables contained in the AA VR block. Each time it receives the service_update command from the USERIF module, the function merely copies the virtual itinerary and VPINCI identifier(s) entered into the Service Table by the system operator at the table queu_id and intrf_id fields.

Based on predefined rules or dynamically by using the information on bit rate contained in the Service Table, the Shaper init function suitably programs MC with the tokens required to limit bands on output ATM connections.

The BCU intf function forms and sends to the suitable queues obtained (one for each active virtual itinerary) in MT the messages for BCUs containing the associations between programs and VPINCIs for the TM connections transporting them. Messages are sent at regular Timer generated intervals in order to respect the band requirements on the channels within which they are transmitted.

The above description is obviously only supplied as a non-limiting example and that variations and modifications are possible without departing from the invention protection field.

What is claimed is:

1. Equipment for remultiplexing encoded audio-video streams transmitted within a switched digital video broadcasting system, each containing multiple programs (multiprogram transport streams), in which program information is transmitted in packets each including a packet identifier supplying information as to the program identity the packet refers to and a payload containing program data or stream structure service information, the equipment being inclusive of:

syntactical analysis and reception means (AS; FL1 . . . FLn, MS1 . . . MSn) suitable to receive a plurality of such streams, separate in each flow packets, hereinafter referred to as "data packets", which can be forwarded directly to output stream generation means (CF; AA, MC, TU), from packets hereinafter referred to as "service packets", which must be forwarded to a control device (MP) to be submitted to processing, in particular for updating service information to reflect the composition of output streams;

means (ME) for temporary storage of data packets, separately for each input stream;

said output stream generation means (CA; AA, MA, TU) to generate and send to serve users output streams obtained starting from the packets stored in said temporary memories (ME) and from the processed service packets, said output streams being single or multi-program streams at a lower band than input streams;

said control device (MP) that is suitable to receive the service packets from syntactical analysis and reception means (AS; FL1 . . . FLn, MS1 . . . MSn), to identify individual streams making up the multiprogram streams, to perform updating of service information and drive temporary memory means (ME) and output stream generation means (CF; AA, MC, TU) so as to enable the creation of single or multi-program streams for different users, wherein:

said output stream generation means (CA; AA, MA, TU) are suitable to create ATM streams by transferring packets related to the same program or group of programs to ATM cells related to one or more virtual channel and multiplexing said virtual channels into multiple itineraries each containing programs of the same input stream, such output stream generation means (CF; AA, MC, TU) being suitable to perform, during ATM stream generation, a two-step control of the band associated to each ATM stream by reading the packets allocated to different virtual channels in such a fashion as to limit the peak band of each virtual channel to a first programmable value not exceeding the band available on ATM stream transport lines and by performing statistical multiplexing of the virtual channels into virtual itineraries and such that the overall band transmitted to each virtual itinerary does not exceed the peak band available for the itinerary; and said temporary memory means (ME) are suitable to store data packets in individual logical queues for a program or group of programs managed by connected lists of pointers each identifying a memory area containing a packet replicated as many times as the number of virtual channels into which a packet is to be entered.

2. Equipment as at claim 1, wherein said syntactical analysis and reception means (AS; FL1 . . . FLn, MS1 . . . MSn) include a group of first memory units (MR1 . . MRn), one for each input stream, suitable for storing for each respective stream a first control word inclusive of a first field containing information on packet validity, a second field active for a valid packet and indicating if the packet is a service or a data packet, and a third field indicating for each data packet into which logical queues it is to be entered, said first control words being prepared and updated by the control device (MP) through continued analysis of the service information contained in the packets supplied to such device (MP) and being read by the input interfaces (FL1 . . . FLn) belonging to such syntactical analysis and reception means (AS; FL1 . . . FLn, MS1 . . . MSn) and each being associated to one of the input streams and therefore to one of the said first memories (MR1 . . . MRn).

3. Equipment as at claim 1 wherein said memory means include and data memory (MD1 . . . MDn) for each input stream and a memory controller (CM1 . . . CMn) for each data memory (MD1 . . . MDn), suitable to dynamically distribute storage capacity among the various logical queues through this management of connected pointer list and inclusive of:

a second memory unit (FF) allocated to store pointers for writing in the free areas of the respective data memory (MD1 . . . MDn) and to issue an indication of the first free pointer based on information received from output stream generation means (CF; AA, MC, TU);

a replication unit (UR), receiving the third control word field from the input interface (FL1 . . . FLn) and pointers from the second memory (FF), and replicating a pointer and its related writing command as many times as the number of queues on which a data packet is to be entered;

a logical queue management unit (QM) receiving and storing pointers from this UR replication unit and issuing them at input on request by the output stream generation means (CF);

an pointer freeing control unit (FP) receiving from this replication unit (UR) and storing the identity of the pointers associated to information on the code number associated to a pointer, receiving a message of having read data memory (MD1 . . . MDn) identified by a given pointer from output stream generation means (CF; AA, MC, TU) and suitable to count such reading messages and to issue a free pointer signal once the number of completed readings in the data memory (MD1 . . . MDn) identified by that given pointer is equal to the number of queues for which the pointer is to be used.

4. Equipment as at claim 1 wherein said output stream generation means (CF; AA, MC; TU) include the following:

a third memory unit (TU) that temporarily stores updated service packets supplied by said control device (MP) split into as many memory areas as the output virtual itineraries, including, for each area, as many positions as the logical queues completed in said temporary memory means (ME);

a fourth memory unit (MC) storing a list of second control words each associated town active virtual channel and containing the input stream identifier and a logical queue of packets to be served at all ATM cell times, the word related to a given virtual channel being entered in the list with a repetition frequency such as to originate at a given list scanning rate a peak band not above the said programmable first value;

a packet segmentation unit (AA) that based on the information contained in such fourth memory unit (MC) is suitable to read from said data memories (MD1 . . . MDn) data service packets containing updated service information from the said third memory unit (TU), to enter the payload of pairs of packets in a group of ATM cells and to associate a header to each ATM cell and a trailer to each cell group.

5. Equipment as at claim 4, wherein said packet segmentation unit AA include the following:

a first logical network (GD) for managing the dialog between output stream generation means (CF) and memory controllers (CM1 . . . CMn), suitable to receive said second control words from the fourth memory unit (MC), request the logical queue management unit (QM) to supply the pointers corresponding to the queues to be read and to construct for each virtual output itinerary a list of third control words each containing the corresponding second control word, information indicating whether said second control word is associated to a service or a data packet, the pointer in case of a data packet and the position of an ATM cell being prepared inside the group of cells where a pair of packets is entered;

a group of fifth memory units (PQ) each suitable to store a list of such third control words;

a second logical network (DR) for managing requests for packets, suitable to receive the lists of said third control words, to generate and issue based on information contained in each of said third control words, either the data memory (MD1 . . . MDn) reading addresses corresponding to the source list of said third control word or the third memory unit (TU) reading addresses and to issue said signal of completed reading to a data memory area after reading a pair of packets.

6. Equipment as at claim 5, wherein said fifth memory units (PQ) are driven by the said control device (MP), suitable to establish the reading frequency of the third control words inside each list.

7. Equipment as at claim 1 wherein it includes means (CR1, CR2) for updating the value of timing information for each program, present in packets pre-set by the program itself, so as to take account of the variable time for traversing the equipment (RM) by the packets, said updating means (CR1, CR2) being suitable to calculate a unit traversing time by a packet containing such information, using a clock signal having the same frequency as the system clock signal and generated by an internal oscillator (OL) inside the equipment (RM), to add such time to the value of the said timing information contained in a packet received and entering the resulting total to the packet before sending it to the equipment (RM) output.

8. Equipment as at claim 7, wherein said updating means (CR1, CR2) include a first unit (CR1) belonging to input interface (FL1 . . . FLn) and suitable to calculate a preprocessed value of said timing information, represented by the difference between the value contained in the packet received and the value of the instant of the arrival of such packet and to replace it for the values contained in the packet received while this packet travels in said interface and a second unit (CR2) belonging to the packet segmentation unit (AA) suitable to replace the pre-set value contained in the packet, while traveling inside the same packet segmentation unit, with an updated value represented by the summation of the pre-set value with a value of the packet output instant, the values of the input and output instants being calculated by counters of the first and respectively second units (CR1, CR2), by using the signals of the mentioned local oscillator.

9. Equipment as at claim 8, wherein the timing information is composed of a first part, which evolves at the frequency of the system clock signal, and of a second part, which evolves at a submultiple frequency of the frequency of said system clock signal, wherein said first and second units (CR1, CR2) are suitable to calculate a first and a second part of the value of the input and output instants of a packet containing such information and to generate as a consequence a first and a second part of the preprocessed value and of the correct value respectively.

10. Equipment as at claim 2 wherein said input interfaces (FL1 . . . FLn) include means (MX2) to receive as an alternative to the said transport streams test streams generated by the mentioned control device (MP) and are also suitable to forward test stream packets to the control device (MP) through the mentioned temporary memory means (ME) and said output stream generation means or through an buffer memory (MT) that temporarily stores the transport stream service packets.

11. Equipment for remultiplexing encoded audio-video streams transmitted within a switched digital video broadcasting system, each containing multiple programs (multiprogram transport streams), in which program information is transmitted in packets each including a packet identifier supplying information as to the program identity the packet refers to and a payload containing program data or stream structure service information, the equipment being inclusive of:

syntactical analysis and reception circuits (AS; FLI . . . FLn, MSI . . . MSn) suitable to receive a plurality of such streams, separate in each flow packets, hereinafter referred to as "data packets", which can be forwarded directly to output stream generation circuits (CF; AA, MC, TU), from packets hereinafter referred to as "service packets", which must be forwarded to a control device (MP) to be submitted to processing, in particular for updating service information to reflect the composition of output streams;

a memory (ME) for temporary storage of data packets, separately for each input stream;

said output stream generation circuits (CA; AA, MA, TU) to generate and send to serve users output streams obtained starting from the packets stored in said memory (ME) and from the processed service packets, such output streams being single or multi-program streams at a lower band than input streams;

said control device (MP) that is suitable to receive the service packets from syntactical analysis and reception circuits (AS; FL1 . . . FLn, MS 1 . . . MSn), to identify individual streams making up the multiprogram streams, to perform updating of service information and drive test said memory (ME) and output stream generation means-circuits (CF; AA, MC, TU) so as to enable the creation of single or multi-program streams for different users, wherein:

said output stream generation mews-circuits (CA; AA, MA, TU) are suitable to create ATM streams by transferring packets related to the same program or group of programs to ATM cells related to one or more virtual channel and multiplexing such virtual channels into multiple itineraries each containing programs of the same input stream, said output stream generation circuits (CF; AA, MC, TU) being suitable to perform, during ATM stream generation, a two-step control of the band associated to each ATM stream by reading the packets allocated to different virtual channels in such a fashion as to limit the peak band of each virtual channel to a first programmable value not exceeding the band available on ATM stream transport lines and by performing statistical multiplexing of the virtual channels into virtual itineraries and such that the overall band transmitted to each virtual itinerary does not exceed the peak band available for the itinerary; and said memory (ME) is suitable to store data packets in 5 individual logical queues for a program or group of programs managed by connected lists of pointers each identifying a memory area containing a packet replicated as many times as the number of virtual channels into which a packet is to be entered.

12. Equipment as at claim 11, wherein said syntactical analysis and reception circuits (AS; FLI . . . FLn, MSI . . . MSn) include a group of first memory units (MRI . . . MRn), one for each input stream, suitable for storing for each respective stream a first control word inclusive of a first field containing information on packet validity, a second field active for a valid packet and indicating if the packet is a service or a data packet, and a third field indicating for each data packet into which logical queues it is to be entered, such first control words being prepared and updated by the control device (MP) through continued analysis of the service information contained in the packets supplied to such device (MP) and being read by the input interfaces (FLI . . . FLn) belonging to said syntactical analysis and reception circuits (AS; FL1 . . . FLn, MS1 . . . MSn) and each being associated to one of the input streams and therefore to one of the said first memories (MR1 . . . MRn).

13. Equipment as at claim 11 wherein said memory includes a data memory (MD1 . . . MDn) for each input stream and a memory controller (CM1 . . . CMn) for each data memory (MD1 . . . MDn), suitable to dynamically distribute storage capacity among the various logical queues through this management of connected pointer list and inclusive of:

a second memory unit (FF) allocated to store pointers for writing in the free areas of the respective data memory (MD1 . . . MDn) and to issue an indication of the first free pointer based on information received from output stream generation circuits (CF; AA, MC, TU);

a replication unit (UR), receiving the third control word field from the input interface (FLI . . . FLn) and pointers from the second memory (FF), and replicating a pointer and its related writing command as many times as the number of queues on which a data packet is to be entered;

a logical queue management unit (QM) receiving and storing pointers from this 35 UR replication unit and issuing them at input on request by the output stream generation circuits (CF);

a pointer freeing control unit (FP) receiving from this replication unit (UR) and storing the identity of the pointers associated to information on the code number associated to a pointer, receiving a message of having read data memory (MD1 . . . MDn) identified by a given pointer from output stream generation circuits (CF; AA, MC, TU) and suitable to count such reading messages and to issue a free pointer signal once the number of completed readings in the data memory (MD1 . . . MDn) identified by that given pointer is equal to the number of queues for which the pointer is to be used.

14. Equipment as at claims 11, wherein said output stream generation circuits (CF; AA, MC, TU) include the following:

- a third memory unit (TU) that temporarily stores updated service packets supplied by said control device (MP) split into as many memory areas as the output virtual itineraries, including, for each area, as many positions as the logical queues completed in said memory (ME);
- a fourth memory unit (MC) storing a list of second control words each associated to an active virtual channel and containing the input stream identifier and a logical queue of packets to be served at all ATM cell times, the word related to a given virtual channel being entered in the list with a repetition frequency such as to originate, at a given list scanning rate, a peak band not above said programmable first value;
- a packet segmentation unit (AA) that based on the information contained in said fourth memory unit (MC) is suitable to read from said data memories (MD1 . . . MDn) data service packets containing updated service information from the said third memory unit (TU), to enter the payload of pairs of packets in a group of ATM cells and to associate a header to each ATM cell and a trailer to each cell group.

15. Equipment as at claim 14, wherein said packet segmentation unit (AA) includes the following:

- a first logical network (GD) for managing the dialog between output stream generation circuits (CF) and memory controllers (CMI . . . CMn), suitable to receive such second control words from the fourth memory unit (MC), request the logical queue management unit (QM) to supply the pointers corresponding to the queues to be read and to construct for each virtual output itinerary a list of third control words each containing the corresponding second control word, information indicating whether said second control word is associated to a service or a data packet, the pointer in case of a data packet and the position of an ATM cell being prepared inside the group of cells where a pair of packets is entered;
- a group of fifth memory units (PQ) each suitable to store a list of such third control words;
- a second logical network (DR) for managing requests for packets, suitable to receive the lists of said third control words, to generate and issue based on information contained in each of said third control words, either the data memory (MD1 . . . MDn) reading addresses corresponding to the source list of said third control word or the third memory unit (TU) reading addresses and to issue such signal for completed reading to a data memory area after reading a pair of packets.

16. Equipment as at claim 15, wherein said fifth memory units (PQ) are driven by the-said control device (MP), suitable to establish the reading frequency of the third control words inside each list.

17. Equipment as at claim 11 wherein it includes circuits (CRI, CR2) for updating the value of timing information for each program, present in packets pre-set by the program itself, so as to take account of the variable time for traversing the equipment (RM) by the packets, said updating circuits (CR1, CR2) being suitable to calculate a unit traversing time by a packet containing such information, using a clock signal having the same frequency as the system clock signal and generated by an internal oscillator (OL) inside the equipment (RM), to add such time to the value of the said timing information contained in a packet received and entering the resulting total to the packet before sending it to the equipment (RM) output.

18. Equipment as at claim 17, wherein said updating circuits (CR1, CR2) include a first unit (CR1) belonging to input interface (FLI . . . FLn) and suitable to calculate a preprocessed value of such timing information, represented by the difference between the value contained in the packet received and the value of the instant of the arrival of such packet and to replace it for the values contained in the packet received while this packet travels in said interface and a second unit (CR2) belonging to the packet segmentation unit (AA) suitable to replace the pre-set value contained in the packet, while traveling inside the same packet segmentation unit, with an updated value represented by the summation of the pre-set value with a value of the packet output instant, the values of the input and output instants being calculated by counters of the first and respectively second units (CR1, CR2), by using the signals of the mentioned local oscillator.

19. Equipment as at claim 18, wherein the timing information is composed of a first part, which evolves at the frequency of the system clock signal, and of a second part, which evolves at a submultiple frequency of the frequency of said system clock signal, wherein said first and second units (CR1, CR2) are suitable to calculate a first and a second part of the value of the input and output instants of a packet containing such information and to generate as a consequence a first and a second part of the preprocessed value and of the correct value respectively.

20. Equipment as at claim 12, wherein said input interfaces (FL . . . Fin) include a multiplexer (MX2) for receiving, as an alternative to the transport streams, test streams generated by [he mentioned control device (MP) and are also suitable to forward test stream packets to the control device (MP) through said memory (ME) and said output stream generation circuits or through an buffer memory (MT) that temporarily stores the transport stream service packets.

* * * * *